United States Patent [19]

Oshita et al.

[11] Patent Number: 4,664,211
[45] Date of Patent: May 12, 1987

[54] ELECTRIC POWER STEERING SYSTEM

[75] Inventors: Saiichiro Oshita; Toyohiko Mouri; Yuji Uemura, all of Ohta, Japan

[73] Assignee: Fuji Jukogyo Kabushiki Kaisha, Tokyo, Japan

[21] Appl. No.: 802,124

[22] Filed: Nov. 26, 1985

[30] Foreign Application Priority Data

Nov. 29, 1984 [JP] Japan ................... 59-253484

[51] Int. Cl.$^4$ ............................................. B62D 5/06
[52] U.S. Cl. ................................... 180/142; 180/79.1
[58] Field of Search .............. 180/133, 141, 142, 143, 180/79.1

[56] References Cited

U.S. PATENT DOCUMENTS 4,437,532  3/1984  Nakamura et al. ................. 180/142

Primary Examiner—John J. Love
Assistant Examiner—Donn McGiehan
Attorney, Agent, or Firm—Martin A. Farber

[57] ABSTRACT

A system having a motor operatively connected to a steering system for reducing the steering effort is provided with a torsion torque sensor for detecting torsion torque in the steering system during a steering operation, and a steering angle sensor provided for detecting steering angle. In response to the output signal of the torsion torque sensor, an assist signal is produced, and in response to the output of the steering angle sensor, a return signal is produced and a reducing signal dependent on the speed of steering of a steering wheel is produced. The reducing signal is added to the assist signal thereby reducing the assist signal, so that the output torque of the motor is decreased. When the steering wheel is stopped in a steered position the output torque of the motor is produced in the return direction of the steering wheel.

19 Claims, 12 Drawing Figures

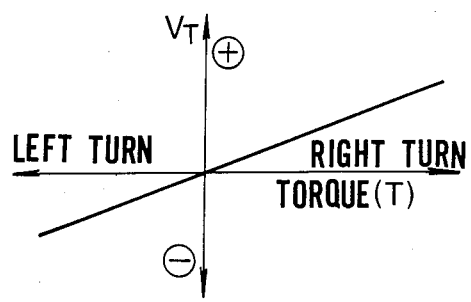
FIG. 3
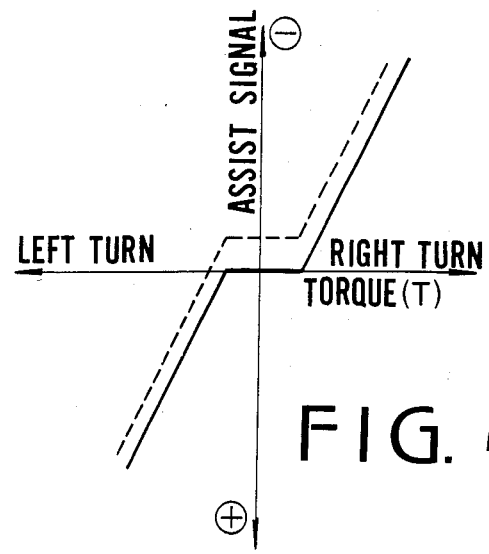
FIG. 4
FIG. 5
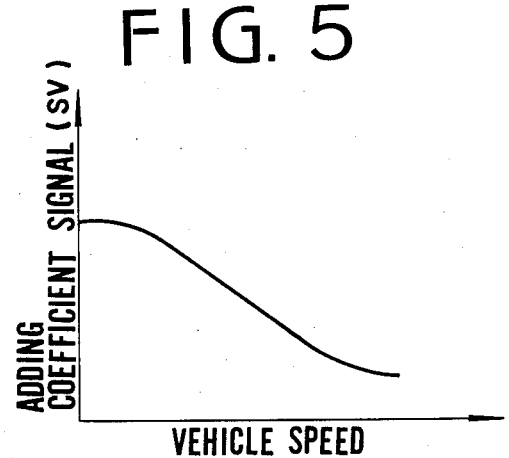

ELECTRIC POWER STEERING SYSTEM

BACKGROUND OF THE INVENTION

The present invention relates to an electric power steering system for a motor vehicle, and more particularly to a system for controlling a motor in accordance with the turning of a steering wheel.

The electric power steering system has a torsion torque sensor for measuring torsion torque in a steering shaft. The system is adapted to control the rotational direction and torque of a motor in dependency on the output signal of the sensor. In order to significantly reduce the driver's steering effort, if the power of the motor is increased, the rotational inertia of the motor increases. The result is that after a turn returnability of the steering-wheel is reduces. In addition, when the vehicle negotiates a corner having a small radius, the steering wheel effort is reduced to a very small value, since the torque of the motor is not changed in accordance with the steering operation speed. Such a light steering load causes uneasiness in the driver.

SUMMARY OF THE INVENTION

The object of the present invention is to provide a system which controls the rotational inertia of a motor in accordance with the steering angle whereby the steering-wheel returnability can be improved and the steering effort can be properly reduced to provide a preferable steering load.

According to the present invention, there is provided an electric power steering system having a motor operatively connected to a steering system for reducing the steering effort, a torsion torque sensor provided for detecting torsion torque during the steering system in steering operation, first means responsive to the output signal of the torsion torque sensor for producing an assist signal, and second means responsive to the assist signal for producing a signal for driving the motor. The system further comprises a third means responsive to the output of the steering angle sensor for producing a return torque signal having reverse polarity to that of the assist signal, and fourth means for adding the return torque signal to the assist signal, so that when the steering wheel is stopped at an angle, said motor is controlled by the sum of the assist signal and the return torque signal.

The other objects and features of this invention will become understood from the following description with reference to the accompanying drawings.

BRIEF DESCRIPTION OF DRAWINGS

FIG. 3 is a graph showing an output characteristic of a torsion torque sensor;

FIG. 4 is a graph showing characteristics of assist signals;

FIG. 5 is a graph showing a characteristic of an adding coefficient signal;

DETAILED DESCRIPTION OF THE PREFERRED EMBODIMENT

Figure 1:
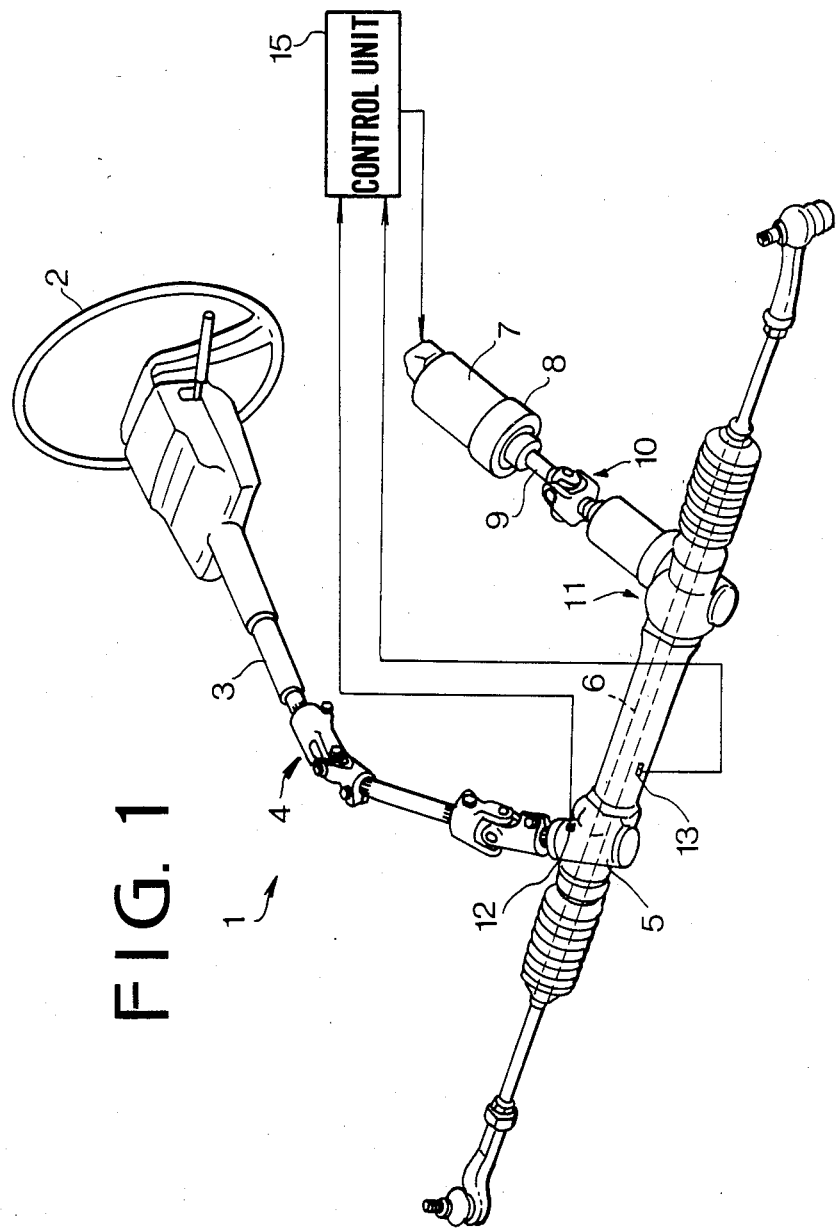
FIG. 1 is a perspective view showing a power steering system to which the present invention may be applied.

Referring to FIG. 1, a steering system 1 is a rack-and-pinion type and comprises a steering wheel 2, steering shaft 3, joint 4, gear box 5, pinion (not shown) and rack 6 operatively interconnected to each other. Another rack-and-pinion (not shown) device 11 is provided for electric power steering. A pinion of the device 11 is engaged with the rack 6. The pinion is operatively connected with an output shaft 9 of a reduction gear device 8 attached to a motor 7. A torsion torque sensor 12 is provided on gear box 5 for measuring the torsion torque of the steering shaft, and a steering angle sensor 13 is provided adjacent to the rack 6 so as to measure the axial movement of the rack 6 corresponding to the steering angle of steering wheels of vehicle (not shown). The outputs of the sensors 12 and 13 are applied to a control unit 15 of the present invention.

Figure 2A:
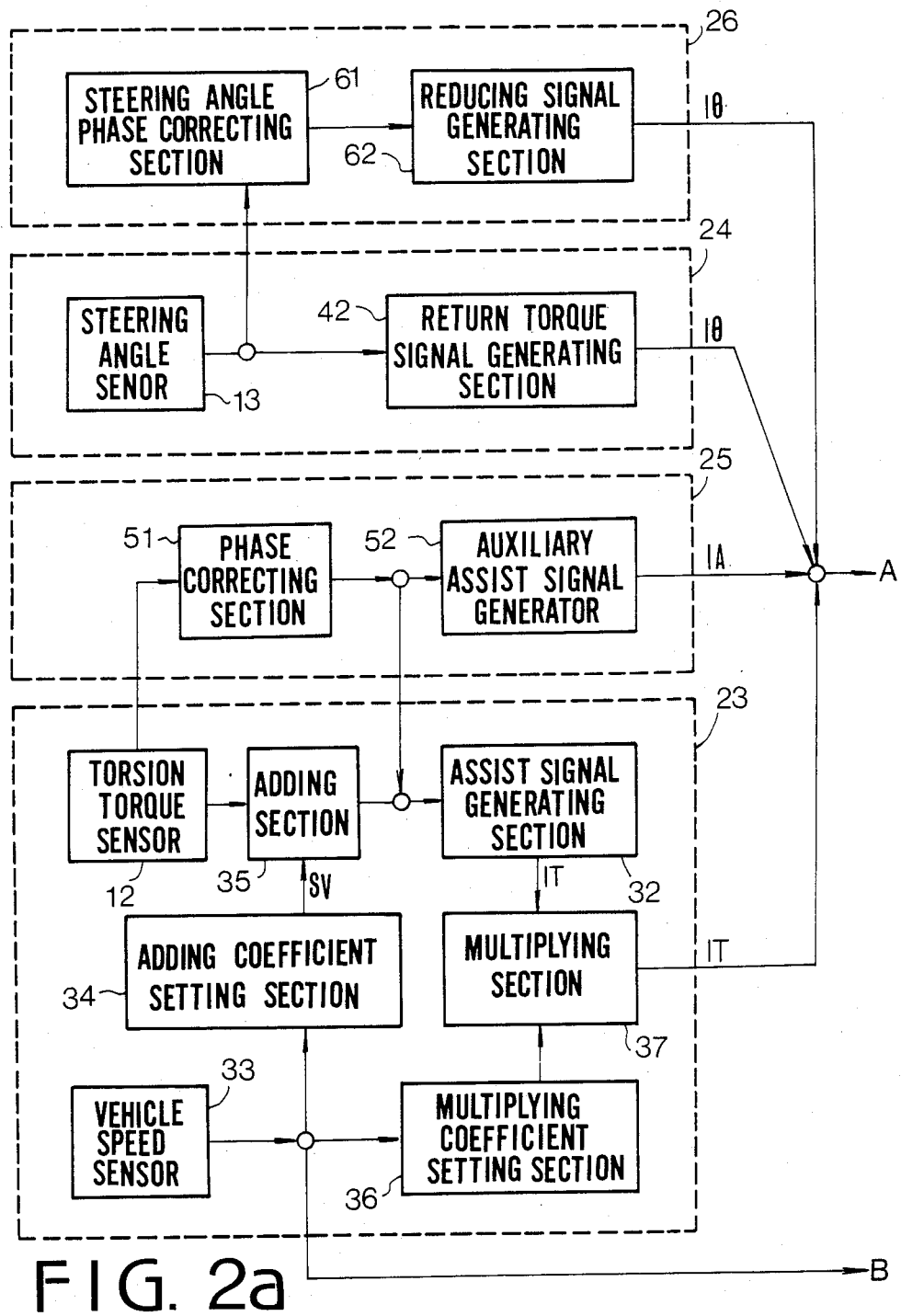
FIG. 2a and 2b are block diagrams of a system according to the present invention.
Figure 2B:
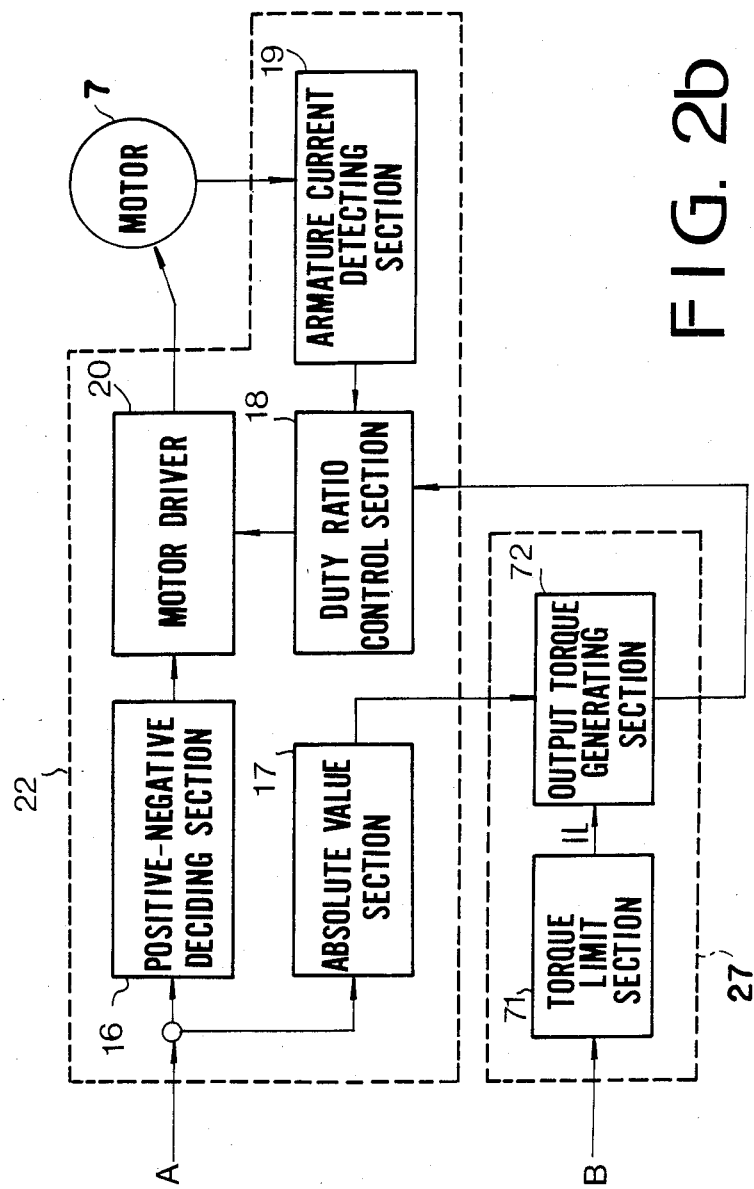

FIGS. 2a and 2b show the control unit 15 which comprises a drive control section 22, assist command section 23, return command section 24, phase correction command section 25, and steering angle phase correction command section 26.

The assist command section 23 comprises torsion torque sensor 12 and vehicle speed sensor 33. The torsion torque sensor 12 produces an output signal, representing the torsion torque and the direction of the torsion at the pinion in the gear box 5 as shown in FIG. 3. The output signal of the vehicle speed sensor 33 is applied to an adding coefficient signal setting section 34 and multiplying coefficient setting section 36. The adding coefficient signal (SV) decreases as the vehicle speed increases as shown in FIG. 5. The outputs of the torsion torque sensor 12 and the adding coefficient setting section 34 are added at an adding section 35, the output of which is applied to an assist signal generating section 32. The assist signal (IT) generates from the section 32 when the torsion torque rises above a predetermined value and has a polarity dependent on the turning direction of the steering wheel as shown in FIG. 4. In accordance with the value of the adding coefficient signal SV, the assist signal IT is shifted along the Y-axis as shown by dashed line in FIG. 4.

Figure 6:
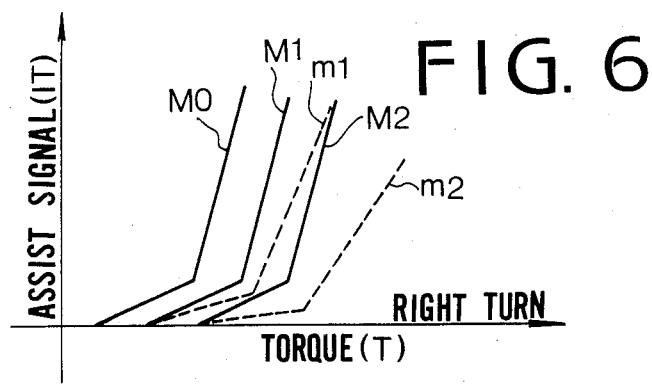
FIG. 6 is a graph showing the variation of the assist signal.
Figure 7:
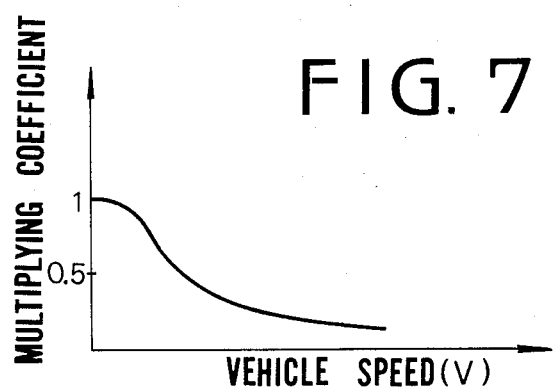
FIG. 7 is a graph of a multiplication coefficient.

FIG. 6 shows assist signals during a right turn. The value of assist signal decreases with an increase of he vehicle speed at the same torsion torque and increases with an increase of the torsion torque. On the other hand, the multiplying coefficient from the section 36 decreases with an increase of the vehicle speed as shown in FIG. 7. The assist signal IT is multiplied by the multiplying coefficient at a multiplying section 37, so that the assist signal is corrected as shown by the dashed lines in FIG. 6.

Figure 8:
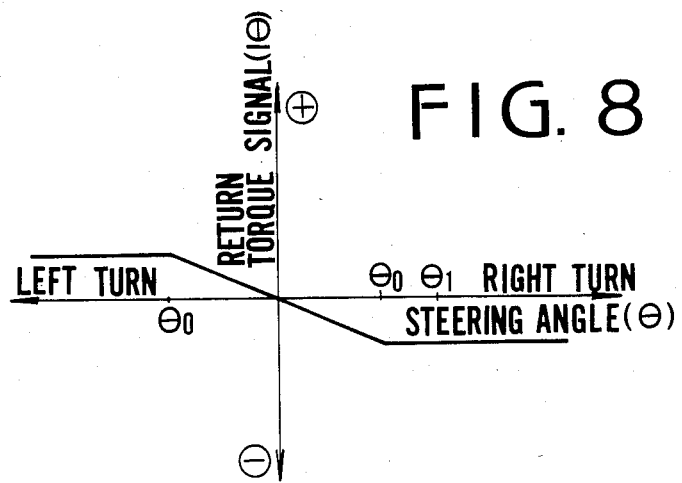
FIG. 8 is a graph of a return signal.

The return command section 24 includes the steering angle sensor 13, the output signal of which is applied to a return torque signal generating section 42. The section 42 generates a return torque signal $I\theta$ dependent on the steering angle as shown in FIG. 8.

The phase correction command section 25 comprises a phase correcting section 51 applied with the output of the torsion torque sensor 12 for producing an output which is proportional to the differential of the output of the sensor. Namely, the output of the section 51 represents the rate or speed of the variation of the torque.

Figure 9:
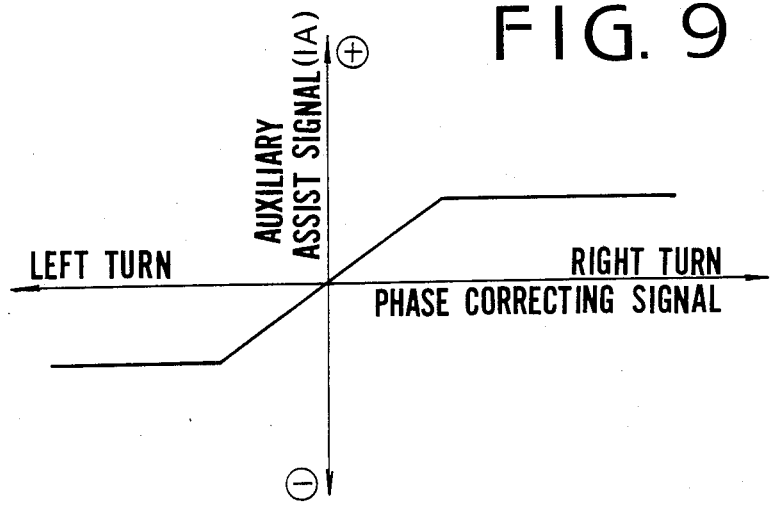
FIG. 9 is a graph showing an auxiliary assist signal.

The output of the phase correcting section 51 is applied to an auxiliary assist signal generating section 52 for producing an auxiliary assist signal IA shown in FIG. 9. The output signal of the section 51 is also applied to the assist signal generating section 32.

Figure 10:
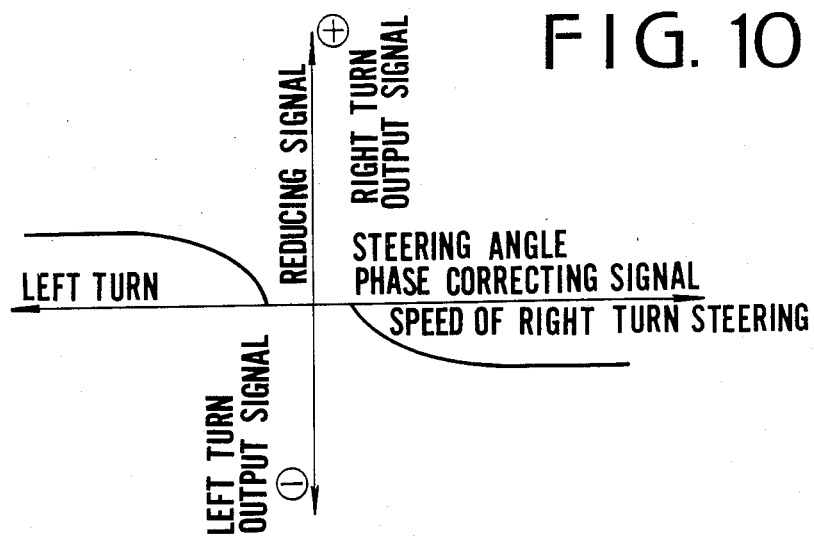
FIG. 10 is a graph showing a reducing signal.

The steering angle phase correction command section 26 has a steering angle phase correcting section 61 applied with the signal from the steering angle sensor 13 for producing an output which is proportional to the differential of the output of the sensor 13, and a reducing signal generating section 62 responsive to the output of the section 61 for producing a reducing signal $I\theta$ shown in FIG. 10. Thus, the output of the section 61 represents the angular speed of the steering of the steering wheel.

The assist signal $I\theta$, auxiliary assist signal IA and reducing signal $I\theta$ are added and the summation is applied to a positive-negative deciding section 16 and an absolute value section 17 of the drive control section 22. The output of the positive-negative deciding section 16 is applied to the motor 7 through a motor driver 20.

Figure 11:
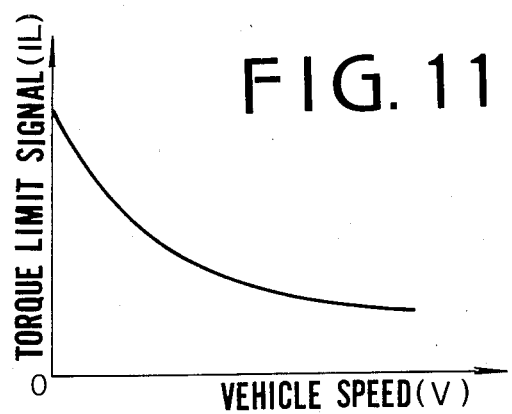
FIG. 11 is a graph of a torque limit signal.

On the other hand, an output torque limit command section 27 is provided. The section 27 comprises a torque limit section 71 applied with the output of the vehicle speed sensor 33 for producing a torque limit signal IL so as to prevent the generation of an assist signal providing extreme assist power, and an output torque signal generating section 72 applied with the outputs of the absolute value section 17 and torque limit section 71. The torque limit signal IL decreases with an increase of the vehicle speed as shown in FIG. 11. The output torque signal generating section 72 produces an output torque signal dependent on the output signals of the sections 17 and 71. The output signal of the section 72 is applied to a duty ratio control section 18 which produces a pulse train, the duty ratio of which is determined by the output signal of the section 72. The pulse train is applied to the driver 20 so that the output torque of the motor 7 is controlled by the duty ratio of the pulse train. The output torque of the motor is fed back to the duty ratio control section 18 by an armature current detecting section 19.

In operation, when a torsion torque is produced by steering operation, an assist signal IT is generated from the assist command section 23. The polarity and absolute value of the assist signal are detected and the duty ratio is determined in accordance with the absolute value by the drive control section 22, so that the output torque of the motor 7 is controlled to reduce the steering effort. As shown in FIG. 4, since the assist signal increases with an increase of the torsion torque, the steering effort is properly reduced in accordance with the torsion torque.

If an extreme assist signal IT generated from the section 23 due to failure of the system, the output of the duty ratio control section 18 is limited within a predetermined range by the signal from the output torque limit command section 27 so as to prevent the generation of an extreme output torque of the motor.

As described above, the assist signal changes with a variation of the output of the vehicle speed sensor 33. Referring to FIG. 6, reference Mo designates an assist signal at vehicle speed of zero when turning of the steering wheel to the right, and M1 and M2 are the assist signals at higher speed V1 and V2 which are moved parallel along the X-axis. Assist signals M1 and M2 are further changed to signals m1 and m2, respectively, each having a smaller inclination by multiplying the signals by the multiplying coefficient from the section 36. Accordingly, the assist signal decreases with an increase of vehicle speed. Therefore, adequate steering effort is required to steer at higher vehicle speed, thereby preventing the occurrence of uneasiness in driving.

On the other hand, the return command section 24 produces a return torque signal $I\theta$ having a characteristic of FIG. 8. The return torque signal $I\theta$ increases in magnitude with an the increase of the steering angle $\theta$ until a predetermined angle $\pm\theta$ after which it has a constant value. For example, when the steering angle is held at an angle $\theta 1$ for a right turn, the motor 7 is controlled by the sum of a positive assist signal IT of section 23 and a negative return signal $I\theta$. Accordingly, if the steering wheel is released, the torsion torque greatly decreases, so that the summation of both signals has a negative value for the left turning. As a result, the motor 7 produces an output torque in the left turning direction so that frictions in the steering system and inertial moment of the motor are reduced. Thus, the steering wheel can be easily returned to the straight ahead position with the aid of the caster effect. Since the magnitude of the return signal $I\theta$ decreases as the steering angle decreases, a high steering-wheel returnability is provided.

When the steering wheel is turned in the stationary state of a vehicle, the torsion torque increases rapidly because of large friction between the tires and the ground. The speed of the rapid increase of the torque is detect by the phase correcting section 51 and the output thereof is added to the output of the sensor 12. Accordingly, an assist signal IT is immediately applied to the drive control section 22 so as to operate the motor 7 without delay.

In response to the output of the phase correcting section 51, the auxiliary assist signal generating section 52 generates an auxiliary assist signal IA shown in FIG. 9. The auxiliary assist signal IA is also added to the assist signal IT. Accordingly, the output torque of the motor immediately assists the steering effort.

When the steering wheel is quickly turned a small angle while driving a vehicle, the angular speed of the steering angle $\theta$ is detected by the steering angle phase correcting section 61. The output of the section 61 is applied to reducing signal generating section 62 which produces a reducing signal $I\theta$ shown in FIG. 10. The reducing signal $I\theta$ is added to the assist signal IT to reduce it. Accordingly, the output of the motor 7 is reduced, thereby increasing the steering effort. Thus, the occurrence of uneasiness in a quick steering operation can be prevented.

While the presently preferred embodiment of the present invention has been shown and described, it is to be understood that this disclosure is for the purpose of illustration and that various changes cand modifications may be made without departing from the scope of the invention as set forth in the appended claims.

What is claimed is:

1. In an electric power steering system for steering wheels of a vehicle steerable by a steering wheel steerably connected thereto, the system having a motor operatively connected to the steering system for reducing steering effort, a torsion torque sensor for detecting torsion torque in the steering system during a steering operation, first means responsive to an output signal of the torsion torque sensor for producing an assist signal, and second means responsive to the assist signal for producing a signal for driving the motor with an output torque, the improvement comprising:
a steering angle sensor for detecting steering angle;
third means responsive to the output of the steering angle sensor for producing a return torque signal having reverse polarity to that of the assist signal; and
fourth means for adding the return torque signal to the assist signal, so that when the steering wheel is stopped at an angle, said motor is controlled by the sum of the assist signal and the return torque signal.

2. The system according to claim 1, wherein said return torque signal has a constant value above a predetermined steering angle.

3. The system according to claim 1, wherein said return torque signal varies from zero at zero steering angle to said constant value as a linear function of steering angle.

4. The system according to claim 1, further comprising
fifth means responsive to the output of the steering angle sensor for producing a reducing signal dependent on the angular steering speed of the steering wheel, and
sixth means for adding the reducing signal to the assist signal for reducing the assist signal, whereby the output torque of the motor is decreased.

5. The system according to claim 4, wherein the fifth means includes means for differentiating the output of the steering angle sensor.

6. The system according to cliam 4, wherein said reducing signal has reverse polarity to that of the assist signal and has a constant value above a predetermined angular steering speed.

7. The system according to claim 6, wherein said reducing signal is zero below a low predetermined angular steering speed.

8. The system according to claim 1, further comprising
means for reducing the assist signal with increasing vehicle speed.

9. The system according to claim 1, further comprising
means for providing a torque limit signal for limiting the assist signal, said torque limit signal decreasing with increasing vehicle speed.

10. The system according to claim 1, further comprising
means for rapidly increasing the assist signal responsive to the output of the torsion torque sensor when the torsion torque rapidly increases.

11. The system according to claim 8, wherein means for rapidly increasing the assist signal provides an auxillary assist signal which has a constant value above a predetermined rate of increase of torque with respect to time.

12. The system according to claim 11, wherein said auxillary assist signal varies to said constant value linearly as a function of rate of increase of torque with respect to time.

13. The system according to claim 8, wherein said reducing means comprises fifth means for adding a first coefficient signal to the output of said torsion torque sensor to decrease the assist signal with increasing speed and sixth means for multiplying said assist signal with a second coefficient signal further to decrease the asist signal with increasing speed by decreasing the slope of the assist signal as a function of torque.

14. The system according to claim 13, further comprising
means for rapidly increasing the assist signal responsive to the output of the torsion torque sensor when the torsion torque rapidly increases, and
said means for rapidly increasing the assist signal adds a correcting signal to the sum of said first coefficient signal and the output of said torsion torque signal.

15. The system according to claim 14, wherein said means for rapidly increasing the assist signal forms said correcting signal as the differential of the output of said torsion torque sensor.

16. In an electric power steering system for steering wheels of a vehicle steerable by a steering wheel steerably connected thereto, the system having a motor operatively connected to the steering system for reducing steering effort, a torsion torque sensor for detecting torsion torque in the steering system during a steering operation, first means responsive to an output signal of the torsion torque sensor for producing an assist signal, and second means responsive to the assist signal for producing a signal for driving the motor with an output torque, the improvement comprising:
a steering angle sensor for detecting steering angle;
third means responsive to the output of the steering angle sensor for producing a reducing signal dependent on the angular steering speed of the steering wheel, and
fourth means for adding the reducing signal to the assist signal for reducing the assist signal, whereby the output torque of the motor is decreased.

17. The system according to claim 16, wherein said reducing signal has reverse polarity to that of the assist signal and has a constant value above a predetermined angular steering speed.

18. The system according to claim 17, wherein said reducing signal is zero below a low predetermined angular steering speed.

19. The system according to claim 18, wherein said reducing signal varies from zero at said low predetermined angular steering speed substantially asymptotically to said constant value as a function of angular steering speed.

* * * * *